US006827512B1

(12) United States Patent
Souluer

(10) Patent No.: US 6,827,512 B1
(45) Date of Patent: Dec. 7, 2004

(54) REFRESHABLE BRAILLE DISPLAY UNIT

(75) Inventor: Farid Souluer, Chester Springs, PA (US)

(73) Assignee: Wagner Products, Inc., West Chester, PA (US)

( * ) Notice: Subject to any disclaimer, the term of this patent is extended or adjusted under 35 U.S.C. 154(b) by 0 days.

(21) Appl. No.: 10/412,826

(22) Filed: Apr. 14, 2003

(51) Int. Cl.[7] ................................................ B41J 5/08
(52) U.S. Cl. .................... 400/483; 400/109.1; 434/114; 434/113
(58) Field of Search ....................... 400/483, 87, 109.1; 434/112–117; 341/21, 22; 340/407.1

(56) References Cited

U.S. PATENT DOCUMENTS

| | | | |
|---|---|---|---|
| 4,033,053 A | 7/1977 | Engler | 434/114 |
| 4,871,992 A | 10/1989 | Peterson | 340/407.1 |
| 5,453,012 A | 9/1995 | Hudecek | 434/114 |
| 5,766,014 A | 6/1998 | Ida et al. | 434/114 |
| 5,772,440 A * | 6/1998 | Ida | 434/114 |
| 6,086,273 A * | 7/2000 | Hong | 400/109.1 |
| 6,354,839 B1 * | 3/2002 | Schmidt et al. | 434/113 |
| 6,357,940 B1 * | 3/2002 | Murphy | 400/483 |
| 2002/0045151 A1 * | 4/2002 | Roberts et al. | 434/113 |

FOREIGN PATENT DOCUMENTS

DE        27 07 362 B 1        2/1977

* cited by examiner

Primary Examiner—Minh Chau
(74) Attorney, Agent, or Firm—John F. A. Earley; John F. A. Earley, III; Harding, Earley, Follmer & Frailey

(57) ABSTRACT

A refreshable display unit with a housing, a plurality of refreshable cells housed in the housing, the cells having a guide block with at least six holes, six motors each with a coupler which may be rotated by the motor, a pin fastened to each coupler and extending into engagement with one of the holes of the guide block, and a stop mounted on each coupler for engaging stop elements mounted on the housing for limiting the rotation of the coupler, the placement of the stop elements on the housing being such that it controls the height extension of the pin fastened to the coupler with respect to the guide block, the unit further having a connector for connecting the display unit to the electronic means of a computer. A unit may have a plurality of keys for inputting a character, including at least two sets of keys, a first set being used when the keyboard is oriented in a first direction and a second set being used when the keyboard is oriented in a second direction.

32 Claims, 5 Drawing Sheets

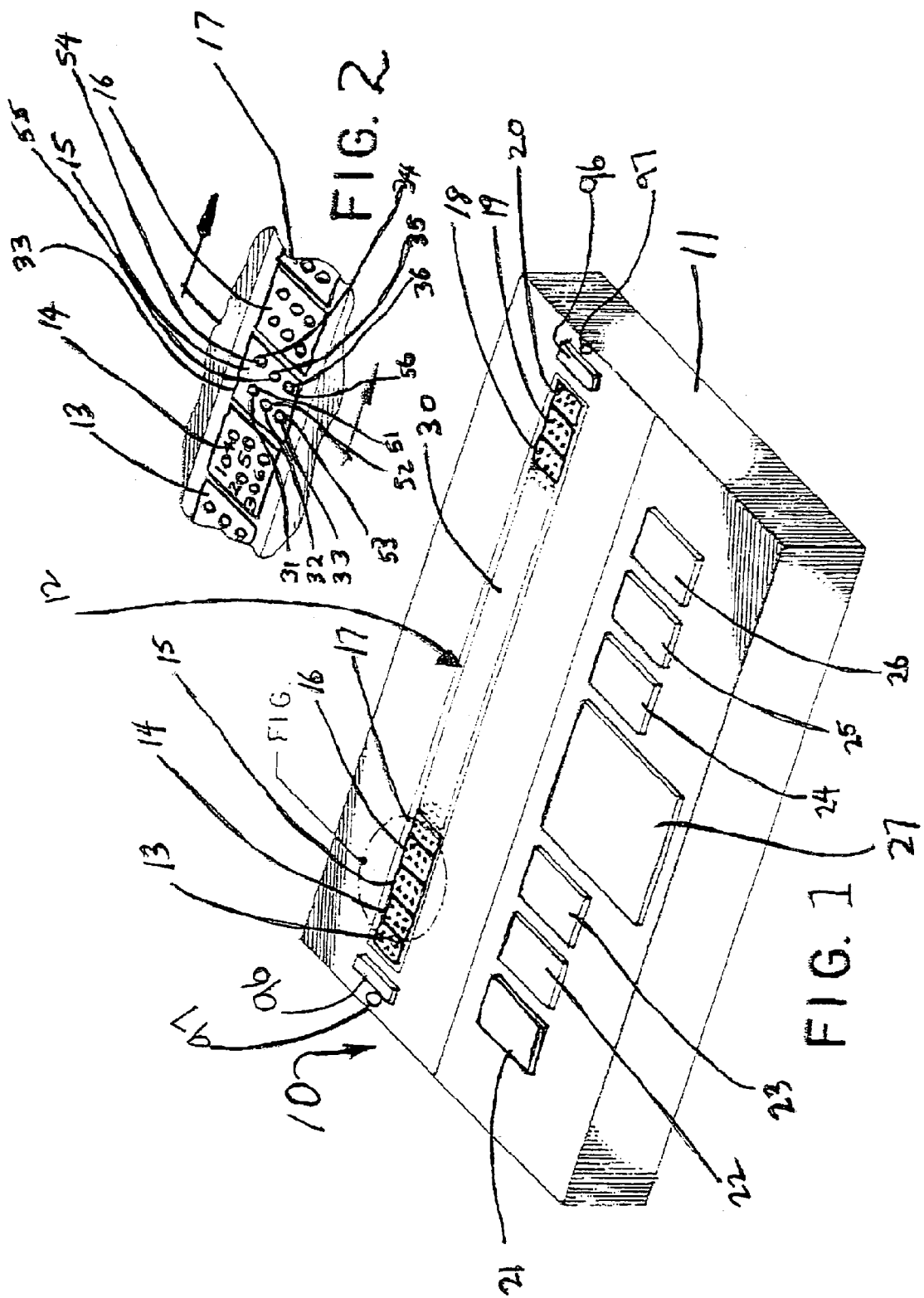

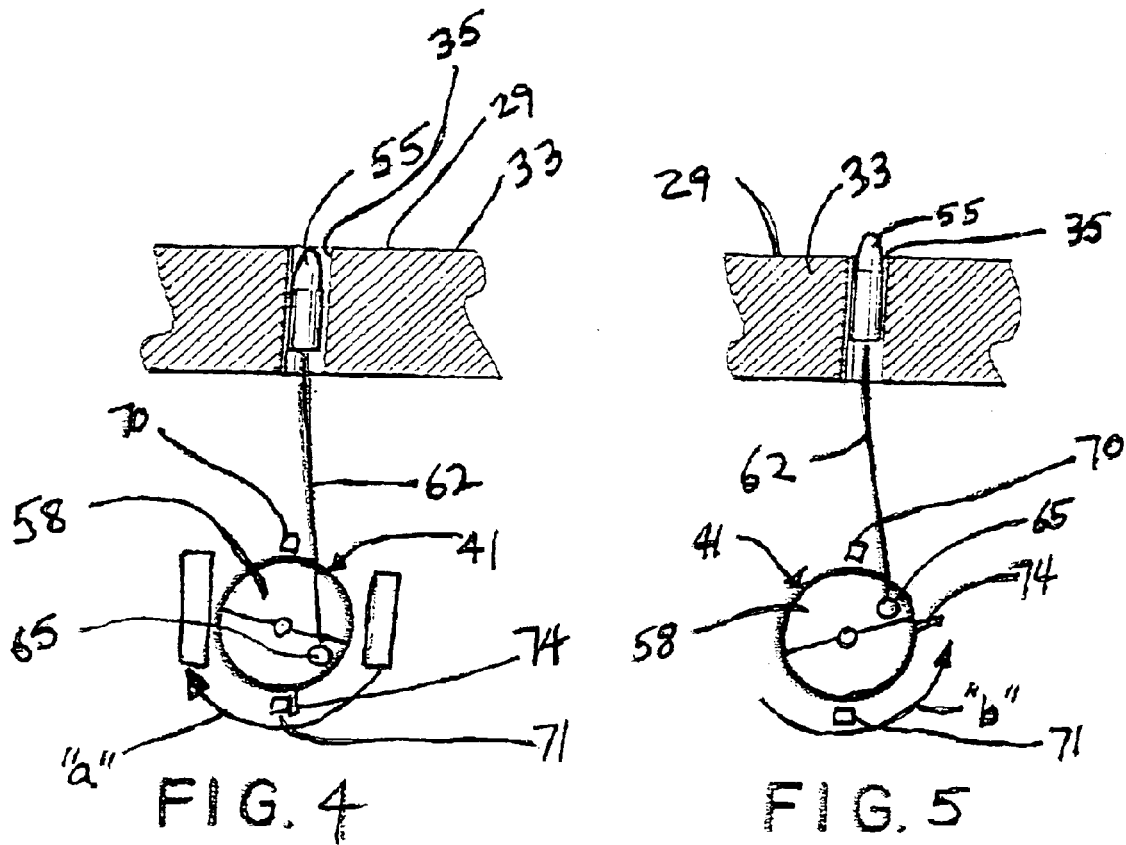
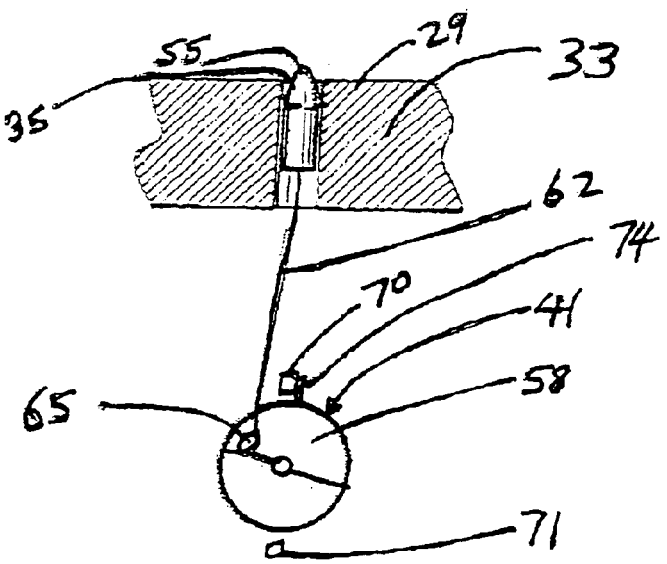
FIG. 4   FIG. 5
FIG. 6

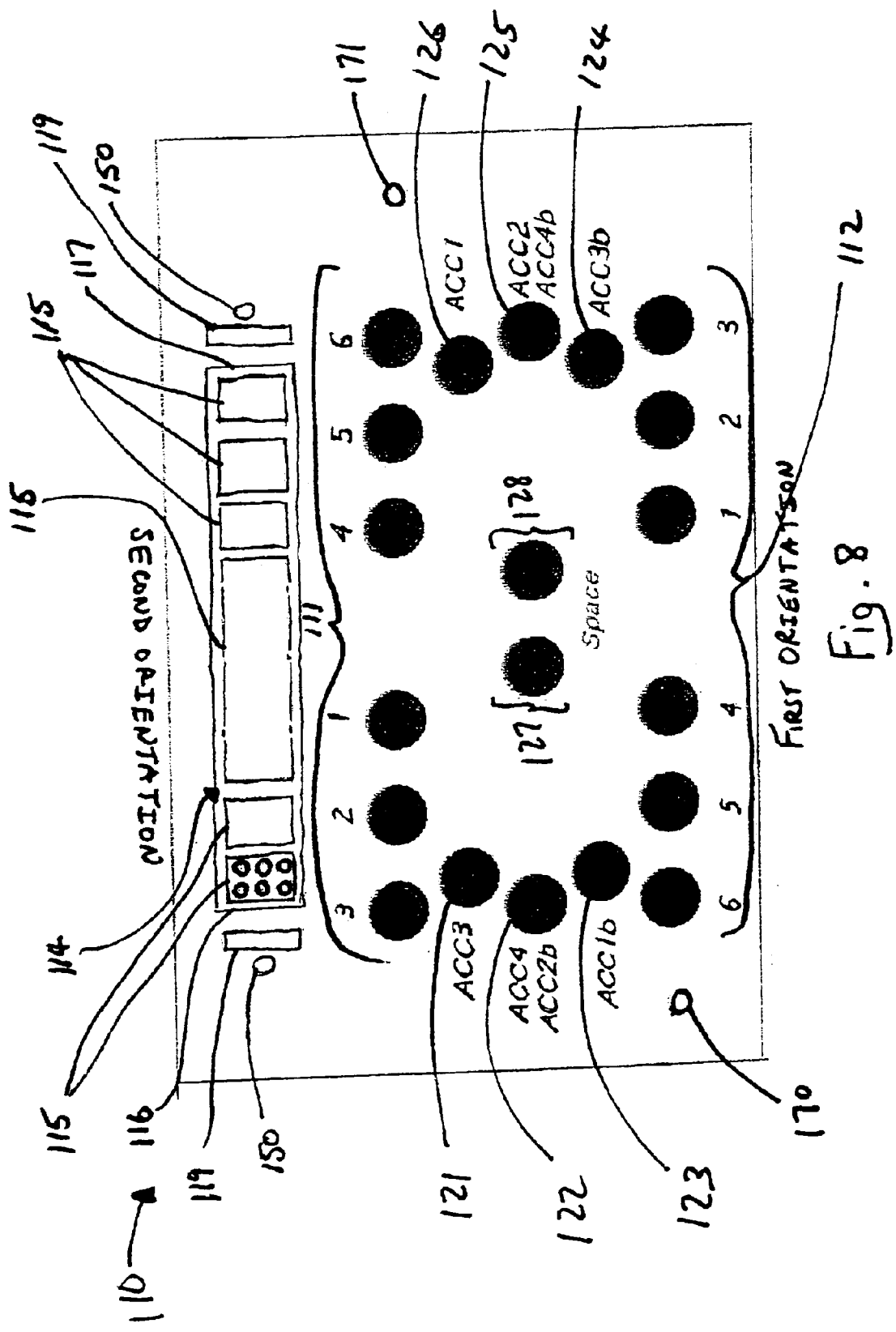

REFRESHABLE BRAILLE DISPLAY UNIT

FIELD OF THE INVENTION

The present invention related to an apparatus for displaying and inputting Braille characters.

BRIEF DESCRIPTION OF THE RELATED ART

Braille was developed to aid the blind to read alphanumeric characters. Braille consists of a six-unit code making up a cell, wherein each cell represents a character. The six-unit code is generally in the form of different combinations of raised bumps. The six-unit code permits a total of about sixty-four combinations, including twenty-six alphabet letters, numbers one through nine, as well as various symbols, including punctuation, indicators, and the like.

Conventional refreshable Braille display units often use piezo material actuation technology, which was introduced in the late 1970's. While the conventional units have proven to be reliable, they have certain drawbacks. For example, one drawback of the prior art units was that they may be very expensive to construct, and in addition, the software used to drive the display may be difficult to learn and may not always be user-friendly. Another drawback is that some prior units rely on gravity to lower a pin which is a problem if the user, due to a disability, requires that the display unit be used on an angle.

Generally, prior devices for displaying Braille characters have included mechanisms which raise and lower a physical point above and below a plane of reference, so that the position of the point, i.e. raised or lowered, can be detected and ascertained by the user's sense of touch. The mechanisms for producing the tactile displays of raised points have generally included cumbersome components, making them large in construction, cumbersome, and expensive to construct and operate. For example, U.S. Pat. No. 4,871,992 discloses the use of an electromagnet to pull a touch pin down from a reference surface. U.S. Pat. No. 5,453,012 discloses a rotary cam actuator to move pins between elevated and lowered positions. U.S. Pat. No. 5,766,014 discloses a binary information display apparatus which displays information by means of an array of a plurality of parallel pins where the pins engage with a rotary cam.

A need exists for a device which may display Braille characters which may be economically made, and which may be less cumbersome than the prior devices.

SUMMARY OF THE INVENTION

The invention provides a refreshable computer Braille display unit, including a housing with a plurality of refreshable cells housed in the housing, where each cell may comprise a guide block having six holes, six motors, each with a coupler which may be rotated by the motor, and a pin fastened to each coupler and being adapted to selectively extend through one of the holes of the guide block, with a stop provided for limiting the rotation of each coupler to control the position of the pin extension.

The invention further provides a keyboard with a Braille display which can be operated from one of a plurality of character sets at different locations on the keyboard.

It is an object of the present invention to provide a novel apparatus for displaying Braille.

It is another object of the present invention to provide a novel apparatus for displaying Braille which is economical to produce.

It is another object of the present invention to provide a novel apparatus for displaying Braille which is generally compact, and not as cumbersome as prior devices.

It is another object of the present invention to provide a novel apparatus which facilitates the retention of the pins in their desired positions for displaying Braille characters.

It is another object of the present invention to provide a novel keyboard which may be oriented in at least two positions.

It is another object of the present invention to provide a novel keyboard which may be oriented so that a user may use a first set of keys or a second set of keys.

It is another object of the present invention to provide a novel keyboard which has a display for displaying Braille characters, and which has key sets disposed both above and below the display.

It is another object of the present invention to provide a keyboard having a display for displaying Braille characters, and which has a first key set disposed above the display and a second key set disposed below the display, and a computer controlled by software to recognize which key set is being used.

These and other advantages may be achieved with the present invention.

BRIEF DESCRIPTION OF THE DRAWING FIGURES

FIG. 1 is a perspective view of a refreshable display unit in accordance with the present invention.

FIG. 2 is an enlarged fragmentary view of the unit of FIG. 1 taken within the phantom circle of FIG. 1.

FIG. 4 is a side elevation view of a motor and coupler, illustrating the pin in its lowered position.

FIG. 5 is a side elevation view of a motor and coupler, illustrating the pin in a position between the raised and lowered position, as the pin is being moved from a lowered, FIG. 4 position, to a raised position.

FIG. 6 is a side elevation view of a motor and coupler, illustrating the pin in a raised position.

FIG. 8 is a top plan view of an alternate embodiment in accordance with the present invention illustrating a keyboard having a first set of keys and a second set of keys.

DETAILED DESCRIPTION THE PREFERRED EMBODIMENTS

Figure 3:
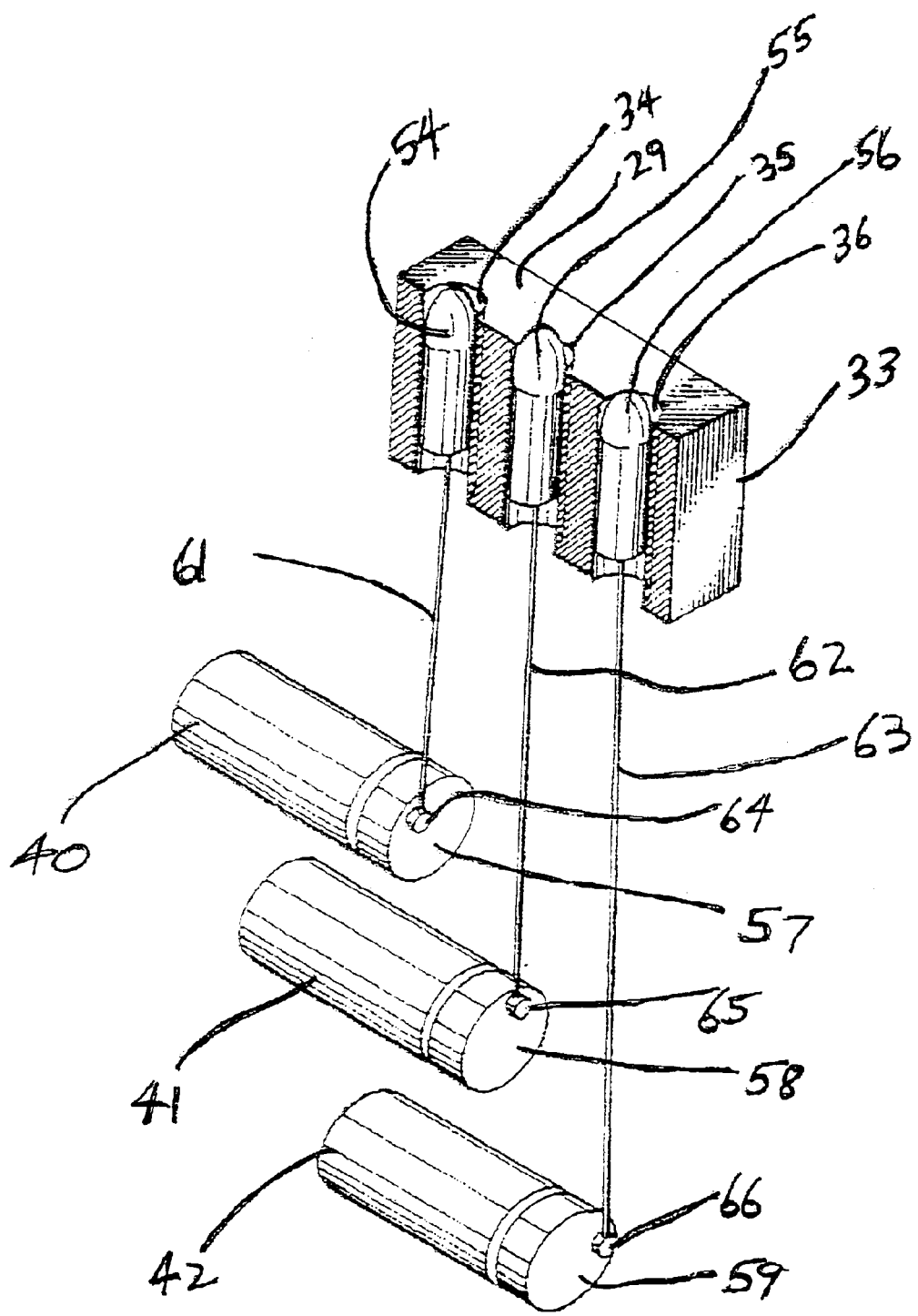
FIG. 3 is a sectional view taken through the guide block along the section line 3-3 of FIG. 2, and showing the pins and motors separate from the other components.

Reference being made to FIG. 1, a refreshable display unit 10 constructed in accordance with the present invention is illustrated having a housing 11, and a display 12. A plurality of refreshable cells 13, 14, 15, 16, 17, 18, 19, 20, are housed within the housing 11 with the area 30 being generally represented by phantom lines, wherein a plurality of cells may be provided within that area 30. Input means for inputting a user's input is provided shown comprising a plurality of keys, 21, 22, 23, 24, 25, 26, each of which keys preferably corresponds to a Braille character set array where the six dots of the Braille cell are numbered 1 through 6, as illustrated in FIG. 2 showing the enlarged view of cell 15, as an example. The unit 10 is used by a user depressing a combination of the keys 21, 22, 23, 24, 25, 26 each of which corresponds to a dot of the Braille character set, as numbered in FIG. 1. For example, the Braille character representing the letter "a" is represented by the dot formation with a single dot in the first row of the first column of the two column, three row matrix. As illustrated in FIG. 2, cell 15 shows a plurality of positions 1 through 6 (numbered in the drawing for illustrative purposes), and, therefore to represent the letter "a" the position of number 1 would be raised, and the other positions, i.e., dots 2, 3, 4, 5, and 6, lowered. A space key 27 is provided on the unit 10, and, when depressed or otherwise actuated, represents entry of the character represented by those keys (21, 22, 23, 24, 25, 26) which are concurrently depressed or otherwise actuated. A combination of one or more keys (21, 22, 23, 24, 25, 26) is subsequently depressed or actuated and, again the space key 27 is depressed or actuated to enter the character represented by the depressed keys. This is continued by the user until the desired character string, such as for example, a word, is formed. The space key 27 is depressed again to add a space, so that the user may continue with a new word, phrase, punctuation, or other character.

The display 12 is provided to display a plurality of characters represented by the cells 13, 14, 15, 16, 17, 18, 19, 20. Once the user enters keystrokes by depressing combinations of keys (21, 22, 23, 24, 25, 26) and entering those combinations, the represented character may be displayed on the display 12. Preferably, one or more cells 13, 14, 15, 16, 17, 18, 19, and 20 of the display 12 each corresponds to a Braille character. A character is represented by a cell based on the number of raised dots or points in the Braille array of places from 1 through 6 (see FIG. 2).

As best shown in FIGS. 2 and 3, preferably, each cell 13, 14, 15, 16, 17, 18, 19, 20, is comprised of a guide block 33 having six apertures 31, 32, 33, 34, 35, and 36. Drive means is provided for driving pins which are to extend through the apertures (31, 32, 33, 34, 35, 36). Preferably, the drive means comprises a motor, such as, for example, the motors 40, 41, 42 shown in FIG. 3. Each motor 40, 41, 42 may comprise any suitable motor, and preferably comprises a DC motor, including, for example, commercially available motors of the type which may be used in a pager or cell phone to produce a vibration. A plurality of pins 51, 52, 53, 54, 55, 56 is shown in FIG. 2 in connection with the cell 15. FIG. 3 shows the pins 54, 55, 56 from the second column of the cell 15 in an enlarged view, and positioned within the respective guide block apertures 34, 35, 36. In accordance with a preferred embodiment of the invention, there is a motor 40, 41, 42 corresponding with each pin 54, 55, 56, FIG. 3 showing the pins 54, 55, 56 of the second column of the cell 15 to facilitate illustration, it being understood that the pins 51, 52, 53 (see FIG. 2) of the first column of the cell 15 are also driven with respective corresponding motors (not shown) which may be identical to those motors 40, 41, 42 of FIG. 3. A coupler 57, 58, 59 is provided, respectively, on each motor 40, 41, 42 to be rotated by the motor. Each pin 54, 55, 56 has a shaft 61, 62, 63, respectively, which is connected to a respective coupler 57, 58, 59 of each respective motor 40, 41, 42, as illustrated in FIG. 3. Suitable fastening means for fastening each pin shaft 61, 62, 63 to a respective coupler 57, 58, 59 is provided, and preferably, as shown in FIG. 3, may comprise a cam pin 64, 65, 66.

Each motor 40, 41, 42 is controlled to rotate a respective coupler 57, 58, 59 in a clockwise or counterclockwise direction. The rotation of the motor 54, 55, 56, in turn, rotates the associated coupler 57, 58, 59 connected thereto to drive the pin 54, 55, 56 connected to the respective coupler 57, 58, 59 to raise and lower the pin 54, 55, 56 relative to the respective guide block aperture 34, 35, 36. Preferably, a computer may control the operation of the motor 40, 41, 42 for each respective pin 54, 55, 56, rotating the motor 40, 41, 42 through a predetermined rotation range to regulate the position of the pin 54, 55, 56 relative to the block 33. The computer may be controlled with software which may be preprogrammed to read user inputs, such as the user inputs from the keys 21, 22, 23, 24, 25, 26, 27, and the characters represented by those keys, to cause the positioning of a pin 51, 52, 53, 54, 55, 56 by a respective motor 40, 41, 42 to be moved to correspond to a lowered or raised position. Preferably, as illustrated in connection with the cell 15, six pins 51, 52, 53, 54, 55, 56 are controlled with six motors, each motor receiving a signal from a controller, computer or other suitable device to power the motor to drive a corresponding pin 51, 52, 53, 54, 55, 56 in a raised or lowered position. A pin may be lowered at or below the surface 29 of the guide block 33, and preferably, a pin is lowered a sufficient amount to simulate to a user's touch an absence of a protrusion. Conversely, when a pin is raised, preferably a pin is raised to a uniform height above the block surface 29 with respect to other pins of the cell 15 which also are to be raised to simulate to the touch the presence of a raised projection.

Referring to FIGS. 4, 5, and 6, there is illustrated the movement of a single pin, such as the pin 55, between lowered (FIG. 4) and raised (FIG. 6) positions. Stop means is provided for stopping the further rotation of the coupler 58, and hence the further driving of the pin 55. Stop means is shown in a first preferred embodiment comprising stops 70, 71 provided for limiting the rotation of the coupler 58 to control the position of the pin 55 and regulate the pin position from a first position where the pin 55 is positioned to extend above the guide block surface 29 (FIG. 6) and a second position where the pin 55 is lowered to a position below the guide block surface 29 (FIG. 4). The transition of the pin 55 from the lowered (FIG. 4) position to the raised position (FIG. 6) is shown in FIG. 5, where the pin 55 is being driven from a lowered position to a raised position. The coupler 58 defines a rotational path, where arrows "a" and "b" in FIGS. 4 and 5 illustrate preferred directions of rotation. The stop means further comprises a leg 74 disposed on the coupler 58 for selective engagement with the stop elements 70, 71. When the coupler 58 and leg 74 are rotated to one of the extreme rotation positions illustrated in FIGS. 4 and 6, where one of the stops 71, 70, respectively, is engaged. Preferably, the leg 74 is disposed axially from the coupler 58. Each corresponding stop element 70, 71 is disposed at a predetermined location along the rotational path traveled by the leg 74 for engagement with the leg 74 at those locations. The stop means facilitates the retention of the pin 55 in the desired position, and supports the pin 55 in the pin aperture 35 and supports the pin 55 against the force applied by a user who touches the pin 55 when reading the display cell. Although described in connection with a single pin 55 of the cell 15, it is understood that the other pins 51, 52, 53, 54, 55, and 56 of the cell 15, may be driven by motors with couplers and stops, and that other cells forming the display 12 may also be configured and operated as is described and shown with respect to the cell 15.

Figure 7:
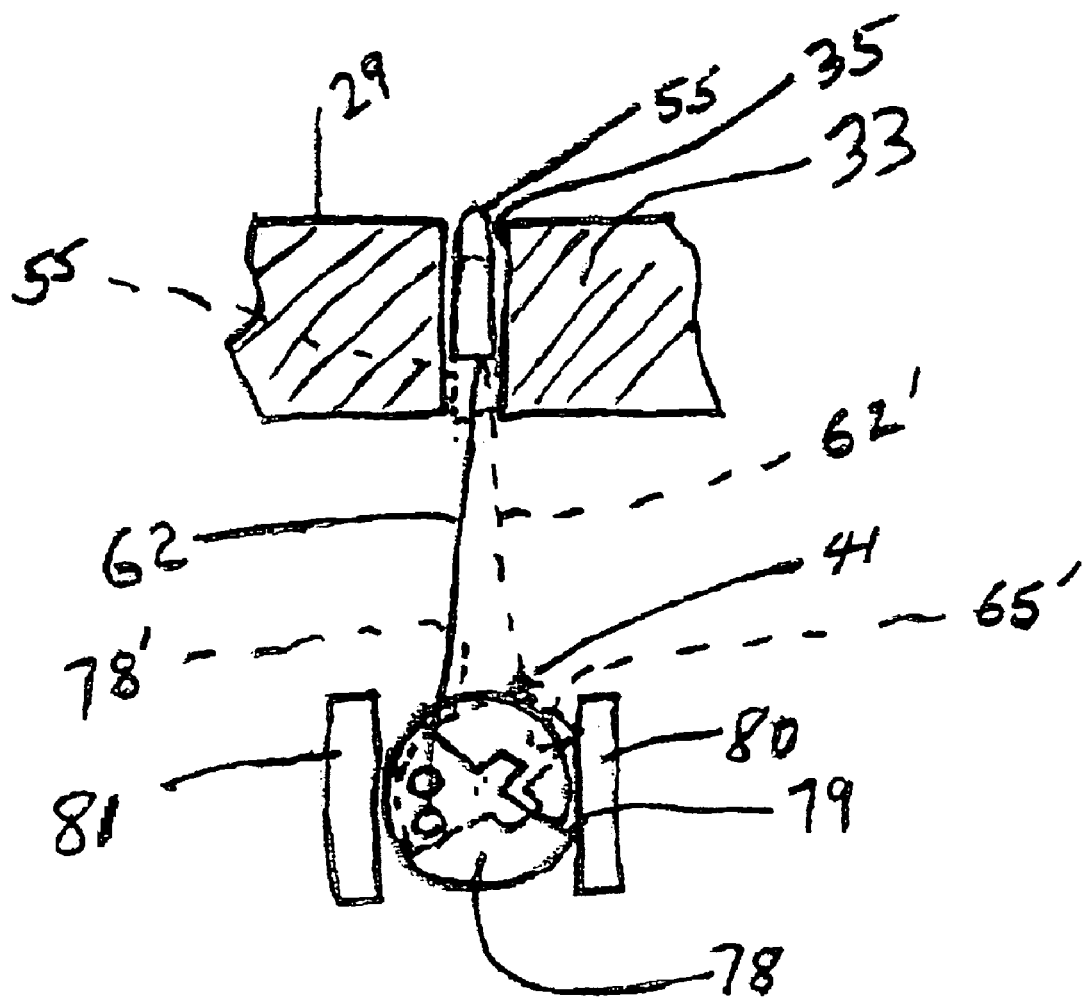
FIG. 7 is an alternate embodiment of a unit in accordance with the present invention, illustrating walls provided on opposite sides of a coupler having an alternate configuration.

In an alternate embodiment illustrated in FIG. 7, stop means is illustrated in a second preferred embodiment comprising wall means having a first wall section 80, and a second wall section 81 positioned proximate to the motor 41. The coupler 78 is configured to be rotated by the motor 41 through a predetermined path of rotation defined by a first position where the coupler 78 engages a first wall section 80 at a first location to limit further rotation of the coupler 78 in a first direction where the pin 55 is in a lowered position, and a second position where the coupler 78 engages a second wall section 81 at a second location to limit further rotation of the coupler 78 in a direction opposite of the first direction, where the pin 55 is in a raised position. As illustrated in FIG. 7, the coupler 78 has a peripheral edge 79 which engages the first wall section 80 and second wall section 81 at respective locations to limit the further travel of the coupler 78 in that direction.

The unit 10 preferably may be provided with means for connecting the display unit 10 to the electronic means of a computer, such as for example, a bus, port, cable, or other suitable connection element. Communications between the unit 10 and the computer are made so that the transmission and receipt of electrical signals corresponding to the series of key strokes and characters, may be recorded by the computer and displayed on the display 12 of the unit 10. Software is preferably provided and the computer is programmed to record and process the information typed by a user, so that each cell of the display 12 may be provided with a Braille character representation for the user to read.

Reference is now made to FIG. 8, where an alternate embodiment of a keyboard 110 for inputting Braille characters is shown. The keyboard 110 has a plurality of keys, including a first set of a plurality of keys 111 and a second set of a plurality of keys 112. The first set of plurality of keys 111 is arranged in a first predetermined location on the keyboard 110, and the second set of plurality of keys 112 is arranged in a second predetermined location on the keyboard 110. The keyboard 110 is configured to have a first orientation and a second orientation. When the keyboard 110 is placed in the first orientation for use, such as, for example, the orientation viewed when looking at FIG. 8, the first set of plurality of keys 111 proximate one side of the keyboard 110 may be used. The second orientation presents the second set of plurality of keys 112 proximate one side of the keyboard 110 for use when the keyboard 110 is positioned for use in the second orientation (i.e., viewed when looking at FIG. 8 upside down). The keyboard 110 is illustrated with a refreshable display 114 for displaying a plurality of Braille characters. Preferably, the display 114 is comprised of a plurality of cells 115 which are provided to display Braille characters by raising and lowering pins, generally, 116. The cells 115 of the keyboard display 114 may be constructed as herein described and shown in connection with the unit 110 illustrated in FIGS. 1 through 7. The display 114 is located on the keyboard 110 above the area of the first set of plurality of keys 111 when the keyboard 110 is positioned for use in a first orientation. The display 114 is located on the keyboard 110 below the area of the second set of plurality of keys 112 when said keyboard 110 is positioned for use in a second orientation, so that the user may read the display 114 below where the user's fingers are typing (or otherwise actuating the keys). The user may select the orientation for use by positioning the keyboard 110 so that the display 114 is above the first set of plurality of keys 111 or below second set of plurality of the keys 112. With the single keyboard 110, the user or users have the option of selecting the option of typing with the display 114 above the keys 111 or with the display below the keys 112.

As illustrated in FIG. 8, a plurality of keys is provided on the keyboard 110. For example, the first get of keys 111 has six Braille keys, numbered from left to right 3, 2, 1, 4, 5, 6, which correspond to a Braille cell array. Space keys 127, 128 are provided and are centrally positioned so that the space keys 127,128 may be used when using either the first set of keys 111 or the second set of keys 112. In addition, function keys 121, 122, 123, 124, 125, 125 are provided, including ACC1 ACC1*b* (read the last typed character or word (anything after the last space)), ACC2 ACC2*b* (backspace (delete the last typed character)), ACC3 ACC3*b* (read the current line), and ACC4 ACC4*b* (Switch to regular keyboard). Other functions may also be included, or alternately provided or associated with the function keys. Preferably, the function keys are provided in duplicate sets, there being a first set of function keys (121, 122, 123) and a second set of function keys (124, 125, 126), each set being used when the keyboard 110 is positioned and used in a respective orientation, with a first set of function keys being used when the keyboard 110 is used in a first orientation, and second set of function keys being used when the keyboard 110 is used in a second orientation.

A computer (not shown) may be provided for processing information received by the keyboard 110. Transmission means may be provided for transmitting an input in the form of an electrical signal from the keyboard 110 to the computer to detect a striking of one or more keys. Preferably, software is used for controlling the computer to read and compare the input associated with the striking of one or more keys of the keyboard 110. The keyboard 110 preferably has switching means for switching the orientation of the characters displayed on the display 114 to correspond to one or the other of the first orientation or the second orientation. The switching means facilitates providing on the display characters oriented to correspond to the orientation of the keyboard 110 which the user is using. The computer or processor may be programmed to compare a plurality of input signals associated with a plurality of key strikes with stored data to determine whether the keyboard 110 is being used in a first orientation or a second orientation. Alternately, the switching means may comprise a user actuated switch 170, 171 disposed on the keyboard 110. The computer may also be programmed or controlled to ignore inputs from the set of keys not being used with the selected or detected keyboard orientation.

The keyboard 110 preferably has means for connecting the keyboard 110 to the electronic means of a computer, which may, for example comprise a cable, bus or other suitable connector. The keyboard 110 also has means for sensing the input of a keystroke, such as for example, sensing the depression or actuation of one or more keys and the entry of the key combinations to represent a character, and for transmitting that input to the computer.

The display 114 is comprised of a plurality of cells 115 which are configured to display a Braille character by displaying the corresponding arrangement of pins, lowered and raised. Refreshing means may be provided for actuating the refreshment of the display 114. The refreshing means may comprise a user actuated switch 150 disposed on the keyboard 110. As shown in FIG. 8, the cells 115 are arranged in a bank having a first end 116 and a second end 117. Alternately, the refreshing means may comprise a sensor 119 disposed to sense the position of the user's finger at at least one of the first bank end 116 and the second bank end 117. A sensor 119 is preferably provided at each bank end 116, 117 so that regardless of the orientation of the keyboard 110, the sensor 119 may detect the user's finger moving to the end of the display 114. The computer may be configured to actuate the corresponding sensor 119 at one side of the display 114 only, and may actuate a sensor 119 based on the input, in the manner or routine that the computer uses to detect which orientation of the keyboard 110 is being used.

Although not shown in FIG. 1, it will be understood that a plurality of function keys may also be provided on the unit 10 to represent a function of a combination of one or more keys, characters or commands. For example, the function keys described and shown with the keyboard 110 may also be utilized in conjunction with the unit 10. The refreshing means, whiled described in connection with the embodiment illustrated in FIG. 8, may also be utilized in connection with the unit 10. For example, refreshing means, may for example comprise a sensor 96, a user actuated switch 97, or both provided on the unit 10, as shown in FIG. 1. While the pins are illustrated within the apertures of the block, it will be understood that a safety bar may be mounted on the housing for the protection of the pins. Although the keys may be actuated by being depressed, other means of actuation may be employed, including, for example, motion sensory detection, with a sensor, voice recognition with voice sensory recognition apparatus, or other suitable actuation device.

What is claimed is:

1. A refreshable display unit comprising,
    a housing;
    a plurality of refreshable cells housed in the housing, each cell comprising:
        (i) a guide block having six holes, (ii) six DC motors (pager type), preferably with all the motors oriented in the same direction, (iii) each motor having a coupler which may be rotated by the motor, (iv) a pin fastened to each coupler and extending into engagement with one of the holes of the guide block, and (v) a stop bar mounted on each coupler for engaging stop pins mounted on the housing for limiting the rotation of the coupler, (vi) the placement of the stop pins on the housing being such that it controls the height extension of the pin fastened to the coupler with respect to the guide block,
    a safety bar mounted on the housing for protecting the pins, and
    means for connecting the display unit to the electronic means of a computer.

2. The unit of claim 1, further comprising a mechanism for displaying Braille characters in said cells.

3. A refreshable computer display unit comprising:
    a) a housing;
    b) a plurality of refreshable cells carried on said housing;
    c) wherein each cell comprises a guide block having an upper surface and at least six apertures therein, a like number of motors corresponding to the number of apertures, a coupler provided on each motor to be rotated by said motor, a pin connected to each coupler and adapted to extend through one of the apertures, and stop means for limiting the rotation of each coupler to control the position of the pin extension relative to the guide block and regulate the pin position from a first position where the pin is positioned to extend above the guide block surface and a second position where the pin is lowered to a position below the guide block surface.

4. The unit of claim 3, wherein said stop means comprises a wall provided proximate to said motor.

5. The unit of claim 4, wherein said coupler is configured to be rotated by said motor through a predetermined path of rotation defined by a first position wherein said coupler engages a wall at a first location to limit further rotation of said coupler in a first direction, and a second position wherein said coupler engages a wall at a second location to limit further rotation of said coupler in a direction opposite of the first direction.

6. The unit of claim 5, wherein said pin is positioned above the guide block surface when said coupler is in said first position, and wherein said pin is positioned below the guide block surface when said coupler is in said second position.

7. The unit of claim 6, wherein each motor is associated with a computer, said computer being controlled by software for regulating the position of each corresponding pin of a cell independently with respect to any other pin of the cell.

8. The unit of claim 5, wherein each motor is independently controllable from any other motor.

9. The unit of claim 3, wherein said coupler defines a rotational path, and wherein said stop means comprises at least one stop element disposed along the rotational path of the coupler, and a leg disposed on the coupler for selective engagement with said stop element.

10. The unit of claim 9, wherein said leg is disposed axially from said coupler, and wherein said stop means comprises a first stop element and a second stop element, each being disposed at a predetermined location along the rotational path of said coupler.

11. The unit of claim 10, wherein each cell comprises a guide block having at least six apertures therein.

12. The unit of claim 3, wherein said stop means limits the depression of said pin against a force of the type generally applied by a user.

13. The unit of claim 3, further comprising means for connecting the display unit to the electronic means of a computer, and means for sensing the input of a keystroke.

14. The unit of claim 3, further comprising refreshing means for actuating the refreshing of the display unit.

15. The unit of claim 14, where the refreshing means comprises a user actuated switch.

16. The unit of claim 14, wherein said cells are arranged in a bank having a first end and a second end, and wherein the refreshing means comprises a sensor disposed to sense the position of the user's finger at at least one of the first bank end and second bank end.

17. The unit of claim 3, further comprising:
    a computer for processing information,
    means for transmitting an input in the form of an electrical signal from a keyboard to the computer to detect a striking of one or more keys of the keyboard,
    software for controlling the computer to read the input associated with the striking of one or more keys, wherein said processor compares a plurality of input signals associated with a plurality of key strikes with stored data to determine whether the keyboard is being used in a first orientation or a second orientation.

18. The unit of claim 3, further comprising:
    a keyboard for inputting Braille characters.

19. The unit of claim 18,
    the keyboard having a first set of a plurality of keys and a second set of a plurality of keys, wherein the first set of plurality of keys is arranged in a first predetermined location on the keyboard, and wherein the second set of plurality of keys is arranged in a second predetermined location on the keyboard, wherein the keyboard has a first orientation and a second orientation, wherein said first orientation presents the first set of plurality of keys proximate one side of the keyboard for use when the keyboard is in said first orientation, and wherein said second orientation presents the second set of plurality of keys proximate one side of the keyboard for use when the keyboard is in said second orientation, the keyboard further comprising a display for displaying a plurality of Braille characters, wherein said display is located on the keyboard below the area of said first set of plurality of keys when said keyboard is in said first orientation, and wherein said display is located on the keyboard above the area of said second set of plurality of keys when said keyboard is in said second orientation.

20. The unit of claim 19, wherein said second set of plurality of keys has a key corresponding to the second set of plurality of keys of the first set.

21. The unit of claim 20, wherein said first plurality of keys includes at least seven keys.

22. The unit of claim 20, wherein said first plurality of keys includes at least seven keys and a plurality of function keys.

23. The unit of claim 19, wherein said first set of plurality of keys includes at least six keys.

24. The unit of claim 19, wherein said display includes a plurality of cells for displaying Braille characters.

25. The unit of claim 19, comprising switching means for switching the orientation of the characters displayed on said display to correspond to one or the other of the first orientation or the second orientation.

26. The unit of claim 25, wherein said switching means comprises a user actuated switch.

27. The unit of claim 19, comprising
a computer for processing information,
means for transmitting an input in the form of an electrical signal from the keyboard to the computer to detect a striking of one or more keys,
software for controlling the computer to read and compare the input associated with the striking of one or more keys, wherein said processor compares a plurality of input signals associated with a plurality of key strikes with stored data to determine whether the keyboard is being used in a first orientation or a second orientation.

28. The unit of claim 27, wherein said computer is controlled by software which displays on said keyboard display a plurality of Braille characters, wherein said display displays characters oriented to correspond to the orientation of the keyboard.

29. The unit of claim 27, further comprising means for connecting the keyboard to the electronic means of a computer, and means for sensing the input of a keystroke.

30. The unit of claim 19, further comprising refreshing means for actuating the refreshment of the display.

31. The unit of claim 30, where the refreshing means comprises a user actuated switch.

32. The unit of claim 30, wherein said cells are arranged in a bank having a first end and a second end, and wherein the refreshing means comprises a sensor disposed to sense the position of the user's finger at at least one of the first bank end and the second bank end.

* * * * *